United States Patent
Yue et al.

(10) Patent No.: US 12,074,443 B2
(45) Date of Patent: Aug. 27, 2024

(54) SOURCE-GRID-LOAD-STORAGE NETWORKED COLLABORATIVE FREQUENCY CONTROL METHOD

(71) Applicants: NANJING UNIVERSITY OF POSTS AND TELECOMMUNICATIONS, Jiangsu (CN); STATE GRID ELECTRIC POWER RESEARCH INSTITUTE CO. LTD, Jiangsu (CN)

(72) Inventors: Dong Yue, Jiangsu (CN); Chunxia Dou, Jiangsu (CN); Zhijun Zhang, Jiangsu (CN); Wenbin Yue, Jiangsu (CN); Xiaohua Ding, Jiangsu (CN); Jianbo Luo, Jiangsu (CN); Yanman Li, Jiangsu (CN); Kun Huang, Jiangsu (CN); Tao Han, Jiangsu (CN)

(73) Assignees: NANJING UNIVERSITY OF POSTS AND TELECOMMUNICATIONS, Jiangsu (CN); STATE GRID ELECTRIC POWER RERESARCH INSTITUTE CO. LTD, Jiangsu (CN)

( * ) Notice: Subject to any disclaimer, the term of this patent is extended or adjusted under 35 U.S.C. 154(b) by 0 days.

(21) Appl. No.: 17/997,537

(22) PCT Filed: Jul. 30, 2021

(86) PCT No.: PCT/CN2021/109632
§ 371 (c)(1),
(2) Date: Oct. 29, 2022

(87) PCT Pub. No.: WO2022/252382
PCT Pub. Date: Dec. 8, 2022

(65) Prior Publication Data
US 2024/0055859 A1 Feb. 15, 2024

(30) Foreign Application Priority Data
Jun. 1, 2021 (CN) .......................... 202110607676.7

(51) Int. Cl.
H02J 3/24 (2006.01)
H02J 3/28 (2006.01)
H02J 3/48 (2006.01)

(52) U.S. Cl.
CPC ............... *H02J 3/241* (2020.01); *H02J 3/28* (2013.01); *H02J 3/48* (2013.01); *H02J 2203/10* (2020.01);
(Continued)

(58) Field of Classification Search
CPC ...... H02J 3/241; H02J 3/28; H02J 3/48; H02J 2203/10; H02J 2300/24; H02J 2300/28; H02J 2300/40
See application file for complete search history.

(56) References Cited

U.S. PATENT DOCUMENTS 10,951,033 B2 * 3/2021 Chae ......................... H02J 3/38
11,126,212 B2 * 9/2021 Jasmin ................... G06Q 50/06
(Continued)

FOREIGN PATENT DOCUMENTS

CN 112234635 * 1/2021 ............... H02J 3/28
CN 112234635 A 1/2021
(Continued)

OTHER PUBLICATIONS

Huang et al, "Research on the optimal coordinated control strategy of 'source-grid-load-storage' including electric vehicle and distributed power supply", 2020, pp. 505-507 downloaded from https://ieeexplore.ieee.org/stamp/stamp.jsp?tp=&arnumber=9194707 (Year: 2020).*

(Continued)

*Primary Examiner* — Robert E Fennema
*Assistant Examiner* — Olvin Lopez Alvarez
(74) *Attorney, Agent, or Firm* — Zhigang Ma

(57) ABSTRACT

A source-grid-load-storage networked collaborative frequency control method is disclosed, which comprises (Continued)

acquiring total active power ΔP to be regulated during a secondary frequency regulation process of a power grid; performing frequency regulation by source-grid-load-storage of the power distribution system, allocating power regulation capacities, and determining whether the desired total active power is met after the frequency regulation; if the desired total active power is met, determining whether power of power generation units is out of limit; if the power of the power generation units is not out of limit, keeping active power of the power distribution system in balance to complete frequency regulation of the power grid; if the power of the power generation units is out of limit, correcting the power regulation capacities of the power generation units of the source-grid-load-storage and compensating a power difference to keep the active power of the power distribution system in balance.

11 Claims, 6 Drawing Sheets

(52) U.S. Cl.
CPC ....... *H02J 2300/24* (2020.01); *H02J 2300/28* (2020.01); *H02J 2300/40* (2020.01)

(56) References Cited

U.S. PATENT DOCUMENTS

| | | | | |
|---|---|---|---|---|
| 2014/0316592 A1* | 10/2014 | Haj-Maharsi | .......... | G05B 15/02 290/44 |
| 2016/0313716 A1* | 10/2016 | Chen | ........................ | H02J 4/00 |
| 2018/0006607 A1* | 1/2018 | An | ........................ | H03D 7/165 |
| 2018/0366978 A1* | 12/2018 | Matan | ........................ | H02J 3/38 |
| 2019/0148942 A1* | 5/2019 | Al-Awami | ................ | H02J 3/46 700/286 |
| 2019/0157876 A1* | 5/2019 | Dobrowolski | .......... | H02J 3/381 |
| 2020/0021236 A1* | 1/2020 | Pan | ........................ | H02J 7/35 |
| 2020/0153274 A1* | 5/2020 | Münz | ................ | H02J 13/00007 |
| 2020/0328599 A1* | 10/2020 | Brombach | .............. | H02J 3/381 |

FOREIGN PATENT DOCUMENTS

| | | | | |
|---|---|---|---|---|
| CN | 112564135 | * | 3/2021 | ............... H02J 3/50 |
| CN | 112564135 A | | 3/2021 | |

OTHER PUBLICATIONS

Tumimo , "Frequency Control in a Power System", 2020 pp. 4 downloaded from https://powerquality.blog/2023/10/11/frequency-control-in-a-power-system/ (Year: 2020).*

Wen et al, "Frequency Regulation of Source-Grid-Load Systems: A Compound Control Strategy", 2016 pp. 69-78, downloaded from https://ieeexplore.ieee.org/document/7312971 (Year: 2016).*

CNIPA, Notification of a First Office Action for CN202110607676.7, Oct. 15, 2021.

Nanjing University of Posts and Telecommunications, State Grid Electric Power Research Institute Co., Ltd (Applicants), Reply to Notification of a First Office Action for CN202110607676.7, w/ (allowed) replacement claims, Oct. 22, 2021.

CNIPA, Notification to grant patent right for invention in CN202110607676.7, Nov. 17, 2021.

* cited by examiner

SOURCE-GRID-LOAD-STORAGE NETWORKED COLLABORATIVE FREQUENCY CONTROL METHOD

FIELD

The invention relates to a source-grid-load-storage networked collaborative frequency control method, and belongs to the technical field of secondary frequency regulation of power distribution networks.

BACKGROUND

With the continuous rise of the proportion of high-capacity units in power grids, the load peak and off-peak difference caused by structural changes increases gradually, and the requirements of users for power quality are becoming increasingly higher, so the stability of the frequency of the power grids receives more and more attention. The frequency of the power system, as a major indicator for evaluating the power quality, is an important assurance to normal and reliable operation of the power system, reflects the equilibrium relationship between active power and loads, and plays a crucial role in the operation of the power system, and more importantly, it is an important control parameter of the operation of the power system and determines the efficiency and security of electrical equipment of a huge number of users and many power generation and supply devices, thus being closely related to our daily life.

At present, power grids dispatch polar plates based on a traditional dispatching mode "change source with loads and only adjust centralized power generation", which mainly dispatches centralized power generation and power grids, and loads, energy storage and adjacent external power supply systems are not taken into account. The year-by-year increase of the proportion of new energy leads a continuous growth of the proportion of new loads such as electric vehicles and energy storage devices, and new energy consuming forms such as load aggregators and intelligent buildings emerge constantly, resulting in new changes of the operating characteristics of the power grids, worsening the frequency regulation situation, and increasing the operation control difficulty of the power grids. The existing dispatching mode will no longer meet new frequency regulation demands gradually, the operation control approach needs to be optimized and improved in diversity, flexibility and collaboration to realize safe operation of the power grids and utilization of clean energy, so as to maximize the social overall benefit. In terms of the traditional dispatching mode, too many loads have to be cut back due to the inadequate frequency regulation capability, leading to overload of devices and transmission sections.

Focusing on the security of large power grids and present power balance, China has carried out practical exploration on load control in the aspects of accurate load control and demand response, and has accumulated much experience, which guarantees, to some extent, the security and balance of the power grids. However, the application of the source-grid-load-storage collaborative control technology still has obvious defects, and particularly, a source-grid-load-storage collaborative frequency control method from the perspective of a whole power grid is not available yet for regional power grids in China, at present.

SUMMARY

The objective of the invention is to overcome the defects of the prior art by providing a source-grid-load-storage networked collaborative frequency control method, which can maintain a balance between power supply and demand and can perform timely regulation according to frequency changes of power grids to cooperatively control the power grids to operate stably. To fulfill this objective, the invention is implemented through the following technical solution: To reach the purpose above, the present utility model adopts the follow technical solution: a magic square power outlet, comprising an outlet body, characterized in that: it further comprises a fixed base which fixes the outlet body and a connection plug which connects another outlet body; the said outlet body has multiple sides and at least two power jacks are configured on the outlet body, the fixed base and connection plug both fit for the power jack; and the outlet body is fixed on the fixed base via the power jack.

In a first aspect, the invention provides a source-grid-load-storage networked collaborative frequency control method, comprising:

Acquiring total active power $\Delta P$ to be regulated by a power distribution system during a secondary frequency regulation process of a power grid;

Performing, according to the acquired total active power, frequency regulation by source-grid-load-storage of the power distribution system, allocating power regulation capacities, and determining whether the desired total active power is met after the frequency regulation;

If the desired total active power is met, determining whether power of power generation units is out of limit;

If the power of the power generation units is not out of limit, keeping active power of the power distribution system in balance to complete frequency regulation of the power grid;

If the power of the power generation units is out of limit, correcting the power regulation capacities of the power generation units of the source-grid-load-storage and compensating a power difference to keep the active power of the power distribution system in balance, so as to complete frequency regulation of the power grid; and If the desired total active power is not met, coordinating the source-grid-load-storage and other resources in the power distribution system to keep the active power of the power distribution system in balance, so as to complete frequency regulation of the power grid.

Further, the power distribution system comprises the source-grid-load-storage, standby energy-storage power stations and adjacent external systems, and the source-grid-load-storage comprises wind power stations, photovoltaic power stations, micro-grid groups, adjustable loads, and energy-storage power stations.

Preferably, the control method is suitable for an active response mode and a passive response mode of the power distribution system.

Further, acquiring total active power $\Delta P$ to be regulated by a power distribution system during a secondary frequency regulation process of a power grid, comprises:

Detecting frequency disturbance of the power grid, and collecting a current frequency of the power grid when the frequency disturbance of the power grid exceeds a rated error.

In the active response mode, actively giving a response to a frequency deviation obtained after primary frequency regulation to calculate a power difference $\Delta P$ to be compensated, by the power distribution system; in the passive response mode, acquiring, by the power distribution system, a power regulation capacity $\Delta P$ issued by a power dispatching system, wherein $\Delta P$ is the total active power to be acquired.

Preferably, the frequency disturbance of the power grid is detected according to the following inequation:

$$|f_{s,t} - f_0| \geq a_1 \quad (1)$$

$$\frac{d|f_{s,t} - f_0|}{dt} \geq b_1 \quad (2)$$

Wherein, $f_{s,t}$ represents instantaneous real-time frequency of the power grid at a time t, $f_0$ represents rated frequency of the power grid, $a_1$ a frequency variation threshold set for starting frequency collection of the power grid, and $b_1$ is a frequency variation rate threshold set for starting frequency collection of the power grid.

Preferably, in the active response mode, the power difference $\Delta P$ to be compensated by the power distribution system is calculated according to all units in the power distribution system:

Output power of the wind power stations is calculated:

$$\sum_{i=1}^{x} \Delta P_{wind\ power\ station\ i} = \sum_{i=1}^{x} \frac{\Delta f}{k_{wind\ power\ station\ i}} \quad (3)$$

Output power of the photovoltaic power station is calculated:

$$\sum_{j=1}^{y} \Delta P_{photoviltaic\ power\ station\ j} = \sum_{j=1}^{y} \frac{\Delta f}{k_{photoviltaic\ power\ station j}} \quad (4)$$

Output power of the micro-grid u s is calculated:

$$\sum_{a=1}^{z} \Delta P_{micro-grid a} = \sum_{a=1}^{z} \frac{\Delta f}{k_{micro-grid\ a}} \quad (5)$$

Output power of the energy-storage power stations is calculated:

$$\sum_{b=1}^{m} \Delta P_{energy-storage\ power\ stationb} = \sum_{b=1}^{m} \frac{\Delta f}{k_{energy-storage\ power\ station\ b}} \quad (6)$$

Total output power:

$$\Delta P = \Sigma_{i=1}^{x} \Delta P_{wind\ power\ station\ i} + \Sigma_{j=1}^{y} \Delta P_{photovoltaic\ power\ stationj} + \Sigma_{a=1}^{z} \Delta P_{micro-grid\ a} + \Sigma_{b=1}^{m} \Delta P_{energy-storage\ power\ station\ b} \quad (7)$$

Wherein, $\Delta f$ is a difference between present frequency and rated frequency of the power distribution system, and x, y, z and m are respectively the number of the wind power stations, the number of the photovoltaic power stations, the number of the micro-grid groups, and the number of the energy-storage power stations of the power distribution system; $\Delta P_{wind\ power\ station}$, is output power to be regulated of an $i^{th}$ wind generator in the wind power stations, $\Delta P_{photovoltaic\ power\ stationj}$ is output power to be regulated of a $j^{th}$ photovoltaic panel in the photovoltaic power stations, $\Delta P_{micro-grid\ a}$ is output power to be regulated of an $a^{th}$ micro-grid in the micro-grid groups, and $\Delta P_{energy-storage\ power\ station\ b}$ is output power to be regulated of a $b^{th}$ energy-storage battery in the energy-storage power stations; $k_{wind\ power\ stationi}$ is a difference adjustment coefficient of the $i^{th}$ wind generator in the wind power stations, $k_{photovoltaic\ power\ stationj}$ is a difference adjustment coefficient of the $j^{th}$ photovoltaic panel in the photovoltaic power stations, $k_{micro-grid\ a}$ is a difference adjustment coefficient of the ad micro-grid in the micro-grid groups, and $k_{energy-storage\ power\ station\ b}$ is a difference adjustment coefficient of the $b^{th}$ energy-storage battery in the energy-storage power station; $\Delta P$ is the total active power to be regulated of the power distribution system.

Further, determining whether the desired total active power is met after the frequency regulation of the source-grid-load-storage of the power distribution system, comprises:

Calculating a total active power regulation capacity C of the source-grid-load-storage of the power distribution system;

Comparing the total active power $\Delta P$ with the total active power regulation capacity C, obtained by calculation, of the source-grid-load-storage of the power distribution system;

If $\Delta P \leq C$, determining that the desired total active power is met after coordinated operation of the source-grid-load-storage of the power distribution system; or If $\Delta P > C$, determining that the desired total active power is not met after coordinated operation of the source-grid-load-storage of the power distribution system.

Preferably, the total active power regulation capacity C of the source-grid-load-storage of the power distribution system is calculated according to the following formula:

$$C = \Sigma_{i=1}^{x} \max WT_i + \Sigma_{i=1}^{y} \max PV_i + \Sigma_{i=1}^{z} \max CDER_i + \Sigma_{i=1}^{m} \max ESU_i \quad (8)$$

Wherein, max WT represents a maximum regulation capacity of the wind power stations of the power distribution system, max PV represents a maximum regulation capacity of the photovoltaic power stations of the power distribution system, max CDER represents a maximum regulation capacity of the micro-grids of the power distribution system, max ESU represents a maximum regulation capacity of the energy-storage power stations of the power distribution system, C is a maximum total regulation capacity of the source-grid-load-storage of the power distribution system and represents the total active power regulation capacity C of the source-grid-load-storage of the power distribution system.

Preferably, power regulation tasks are initially allocated to power generating sources based on the difference adjustment coefficients of the source-grid-load-storage as follows:

$$chengji = \Pi_{i=1}^{x} kWT_i \times \Pi_{i=x+1}^{x+y} kPV_i \times \Pi_{i=x+y+1}^{x+y+z} kCDER_i \times \Pi_{i=x+y+z+1}^{x+y+z+m} kESU_i \quad (9)$$

$$Y_i = chengji \div kWT_j, i = j = (1,2,\ldots,x) \quad (10)$$

$$Y_i = chengji \div kPV_j, i = (x+1, x+2, \ldots, x+y), j = (1,2,\ldots,y) \quad (11)$$

$$Y_i = chengji \div kCDER_j, i = (x+y+1, x+y+2, \ldots, x+y+z), j = (1,2,\ldots,z) \quad (12)$$

$$Y_i = chengji \div kESU_j, i = (x+y+z+1, x+y+z+2, \ldots, x+y+z+m), j = (1,2,\ldots,m) \quad (13)$$

$$Total = \Sigma_{i=1}^{x+y+z+m} Y_i \quad (14)$$

$$PWT_j = \Delta P \times (Y_i \div Total), i = j = (1,2,\ldots,x) \quad (15)$$

$$PPV_j = \Delta P \times (Y_i \div Total), i = (x+1, x+2, \ldots, x+y), j = (1,2,\ldots,y) \quad (16)$$

$$PCDER_j = \Delta P \times (Y_i \div Total), i = (x+y+1, x+y+2, \ldots, x+y+z), j = (1,2,\ldots,z) \quad (17)$$

$$PESU_j = \Delta P \times (Y_j \div \text{Total}), i=(x+y+z+1, x+y+z+2, \ldots, x+y+z+m), j=(1,2,\ldots,m) \quad (18)$$

Wherein, chengji is a product of the difference adjustment coefficients of all the wind power stations, photovoltaic power stations, micro-grid groups and energy-storage power stations of the power distribution system; Y is a product of the difference adjustment coefficients after a specific unit is removed from the wind power stations, photovoltaic power stations, micro-grid groups and energy-storage power stations of the power distribution system; $PWT_j$ is predictive output power, obtained by calculation, allocated to the $j^{th}$ wind generator in the wind power stations, $PPV_j$ is predictive output power, obtained by calculation, allocated to the $j^{th}$ photovoltaic panel in the photovoltaic power stations, $PCDER_j$ is predictive output power, obtained by calculation, allocated to the $j^{th}$ micro-grid in the micro-grid groups, and $PESU_j$ is predictive output power, obtained by calculation, allocated to the $j^{th}$ energy-storage battery in the energy-storage power stations.

Further, if the power of the power generation units is out of limit, correcting the power regulation capacities of the power generation units of the source-grid-load-storage and compensating a power difference, comprises:

Adjusting the output power of a power generation unit with the power being out of limit to maximum, and correcting power allocated to the other power generation units in the source-grid-load-storage of the power distribution system according to inverse ratios of the difference adjustment coefficients of these power generation units to the difference adjustment coefficient of the out-of-limit power generation unit;

Checking whether the power of the other power generation units is out of limit after correction, and correcting a power generation unit with the power being out of limit until all power generation units with the power being out of limit are corrected;

When the total active power regulation capacity of all the power generation units still does not meet the total active power ΔP to be regulated after correction, adjusting power allocated to the micro-grid groups;

When the total active power regulation capacity of all the power generation units still does not meet the total active power ΔP to be regulated after power is reallocated to the micro-grid groups, using the energy-storage power stations to compensate an active power deficiency; and When the total active power ΔP to be regulated is still not met after the energy-storage power stations are used, using the standby energy-storage power stations in the power distribution system to compensate the active power deficiency to keep the active power of the power distribution system in balance, so as to complete frequency regulation of the power grid.

Preferably, when total active power ΔP to be regulated is still not met after the active power is corrected, power is reallocated to the micro-grids and the energy-storage power station are used, the standby energy-storage power stations in the power distribution system are used to compensate the active power deficiency according to the following expression:

$$\Delta P \leq \Sigma_{i=1}^{x} PWT_i + \Sigma_{i=1}^{y} PPV_i + \Sigma_{i=1}^{z} PCDER_i + \Sigma_{i=1}^{m} PESU_i + \max bESU \quad (19)$$

$$PbESU = \Delta P - \Sigma_{i=1}^{x} PWT_i + \Sigma_{i=1}^{y} PPV_i + \Sigma_{i=1}^{z} PCDER_i + \Sigma_{i=1}^{m} PESU_i \quad (20)$$

Wherein, max bESU maximum output power of the standby energy-storage power stations, and PbESU is actual output power of the standby energy-storage power stations.

Further, when the desired total active power is not met, coordinating the source-grid-load-storage and other resources in the power distribution system, comprises:

Adjusting the regulation capacity of the power generation units, the micro-grid groups and the energy-storage power stations of the source-grid-load-storage of the power distribution system to maximum, and compensating an active power deficiency by the standby energy-storage power stations in the power distribution system.

Preferably, when the total active power ΔP to be regulated is not met after the regulation capacity of the power generation units, the micro-grid groups and the energy-storage power stations of the source-grid-load-storage of the power distribution system is adjusted to maximum, the standby energy-storage power stations in the power distribution system are used to compensate the active power deficiency according to the following expression:

$$\Delta P \leq C + \max bESU \quad (21)$$

$$PbESU = \Delta P \quad (22)$$

Wherein, max bESU is maximum output power of the standby energy-storage power stations, and PbESU is actual output power of the standby energy-storage power stations.

Further, when the total active power ΔP to be regulated is still not met after the standby energy-storage power stations in the power distribution system are used, the adjustable loads of the source-grid-load-storage are deployed to decrease or increase active power consumption.

Preferably, the deploying of the adjustable loads of the source-grid-load-storage comprises: comparing the total active power ΔP required for frequency regulation of the power grid with the sum of the capacity of source-grid-storage of the power distribution system, the capacity of the standby energy-storage power stations and the capacity of the adjustable loads.

Preferably, when the total active power ΔP to be regulated is still not met after the regulation capacity of the power generation units, the micro-grid groups and the energy-storage power stations of the source-grid-load-storage of the power distribution system is adjusted to maximum and the standby energy-storage power stations in the power distribution system are used, the adjustable loads are adjusted to maximum to meet the total active power ΔP to be regulated according to the following expression:

$$\Delta P \leq C + \max bESU + \max aload \quad (23)$$

When the total active power ΔP to be regulated is still not met after the active power is corrected, power is reallocated to the micro-grids and the energy-storage power stations and the standby energy-storage power stations are used, the adjustable loads of the source-grid-load-storage are deployed according to the following expression:

$$\Delta P \leq \Sigma_{i=1}^{x} PWT_i + \Sigma_{i=1}^{y} PPV_i + \Sigma_{i=1}^{z} PCDER_i + \Sigma_{i=1}^{m} PESU_i + \max bESU + \max aload \quad (24)$$

$$aload = \Delta P - \Sigma_{i=1}^{x} PWT_i + \Sigma_{i=1}^{y} PPV_i + \Sigma_{i=1}^{z} PCDER_i + \Sigma_{i=1}^{m} PESU_i - \max bESU \quad (25)$$

Wherein, max aload is a maximum adjustable value of the adjustable loads, and aload is an actual adjustable value of the adjustable loads.

Further, when the total active power ΔP to be regulated is still not met after the standby energy-storage power stations in the power distribution system are used and the adjustable loads are deployed, the adjacent external systems and active power of other power distribution networks are used to compensate the active power deficiency.

Preferably, the using of the adjacent external systems comprises: comparing the total active power $\Delta P$ required for frequency regulation of the power grid with the sum of the capacity of source-grid-load-storage of the power distribution system, the capacity of the adjustable loads and the capacity of the external systems, wherein an on-loan value of the external systems is set.

Preferably, when the total active power $\Delta P$ to be regulated is still not met after the regulation capacity of the source-grid-load-storage of the power distribution system is adjusted to maximum and the standby energy-storage power stations and the adjustable loads are all adjusted to maximum, the adjacent external systems are used according to the following expression:

$$\Delta P \leq C + \max bESU + \max aload + \max waibu \quad (26)$$

$$waibu = \Delta P - C - \max bESU - \max aload \quad (27)$$

When the total active power $\Delta P$ to be regulated is still not met after the active power is corrected, power is reallocated to the micro-grids, and the energy-storage power station and the standby energy-storage power stations are used and the adjustable loads are adjusted, the adjacent external systems are used according to the following expression:

$$\Delta P \leq \Sigma_{i=1}^{x} PWT_i + \Sigma_{i=1}^{y} PPV_i + \Sigma_{i=1}^{z} PCDER_i + \Sigma_{i=1}^{m} PESU_i + \max bESU + \max aload + \max waibu \quad (28)$$

$$waibu = \Delta P - \Sigma_{i=1}^{x} PWT_i + \Sigma_{i=1}^{y} PPV_i + \Sigma_{i=1}^{z} PCDER_i + \Sigma_{i=1}^{m} PESU_i + \max bESU + \max aload \quad (29)$$

Wherein, max waibu is a maximum dispatching value of the external adjacent system, and waibu is an actual dispatching value of the external adjacent system.

Further, the source-grid-load-storage networked collaborative frequency control method further comprises: allocating power regulation capacities to the units in the power distribution systems according to a principle of economic optimality when the standby energy-storage power stations and the adjacent external systems are used and the adjustable loads are deployed for active power compensation.

Further, the principle of economic optimality comprises: using the standby energy-storage power stations in order according to high generating capacity and lower failure rate, with reference to historical power generation data and failure rate all year round; using the adjustable loads in order according to low importance and low compensation cost, with reference to the level of importance and compensation cost; and using the adjacent external systems in order according to high energy utilization rate and low dispatching cost, with reference to real-time electricity price and dispatching loss.

Preferably, the power of the power generation units being out of limit means that the power regulation capacities are higher or lower than limits of the regulation capacity of the power generation unit.

Compared with the prior art, the source-grid-load-storage networked collaborative frequency control method provided by the embodiments of the invention has the following beneficial effects:

According to the invention, the total active power $\Delta P$ to be regulated by a power distribution system during a secondary frequency regulation process of a power grid is acquired, frequency regulation is performed by source-grid-load-storage of the power distribution system according to the acquired total active power, output power of power generation sources, micro-grids, loads and stored energy can be reasonably regulated to compensate a power difference, and the output power and frequency of each power generation source are maintained within permissible ranges, and long-term load disturbance can be handled; and the invention gives full play to the regulation advantages of the power distribution system, can obtain power from external systems and can withstand severe load disturbance;

The invention takes into account both the rapidity and continuity of frequency regulation of new energy, makes full use of new energy resources, solves the problems of shortage of quick frequency regulation sources of regional power distribution systems, frequency system fluctuation under long-term small interference, and overload of equipment caused by mass load cutback for frequency regulation, can maintain a balance between power supply and demand, and can perform timely according to frequency changes of the power grid to cooperatively control the power grid to operate stably.

DETAILED DESCRIPTION

The invention will be further described below in conjunction with the accompanying drawings. The following embodiments are merely used to explain the technical solutions of the invention more clearly, and should not be construed as limiting the protection scope of the invention.

Figure 1:
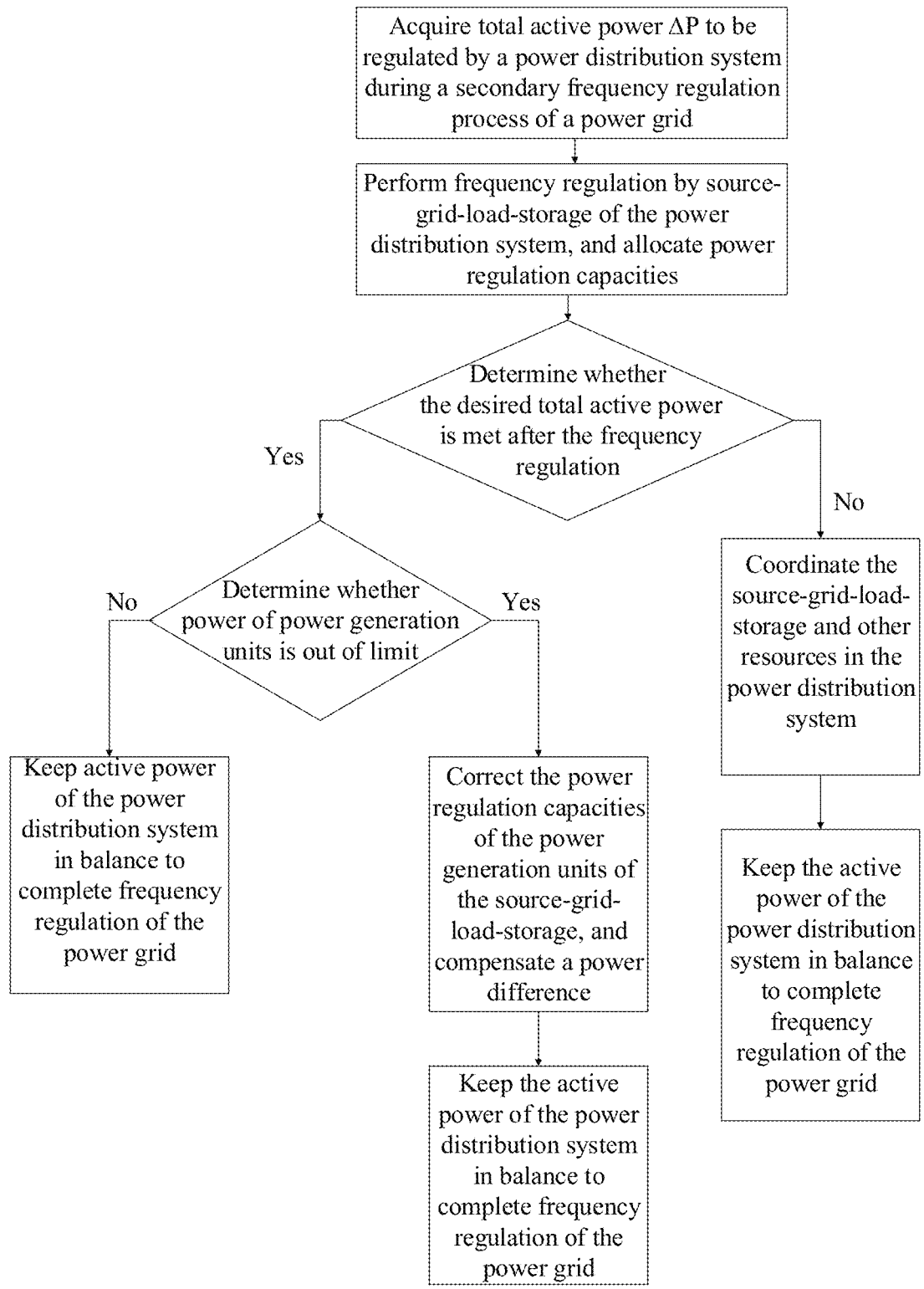
FIG. 1 is a flow diagram of a source-grid-load-storage networked collaborative frequency control method according to one embodiment of the invention.

As shown in FIG. 1, a source-grid-load-storage networked collaborative frequency control method comprises:

Total active power $\Delta P$ to be regulated by a power distribution system during a secondary frequency regulation process of a power grid is acquired;

Frequency regulation is performed on source-grid-load-storage of the power distribution system according to the acquired total active power, power regulation capacities are allocated, and whether the desired total active power is met after the frequency regulation is determined;

If the desired total active power is met, whether power of power generation units is out of limit is determined;

If the power of the power generation units is not out of limit, active power of the power distribution system is kept in balance to complete frequency regulation of the power grid;

If the power of the power generation units is out of limit, the power regulation capacities of the power generation units of the source-grid-load-storage are corrected, and a power difference is compensated to keep the active power of the power distribution system in balance, so as to complete frequency regulation of the power grid;

If the desired total active power is not met, the source-grid-load-storage and other resources in the power distribution system are coordinated to keep the active power of the power distribution system in balance, so as to complete frequency regulation of the power grid.

The specific steps are as follows:

Step 1: total active power ΔP to be regulated by a power distribution system during a secondary frequency regulation process of a power grid is acquired.

Specifically, in case of frequency disturbance of the power grid, the power distribution system receives a power regulation instruction from a superior power system. The frequency disturbance of the power grid is detected, and when the frequency disturbance of the power grid exceeds a rated error, a current frequency of the power grid is collected. In an active response mode, the power distribution system actively gives a response to a frequency deviation obtained after primary frequency regulation to calculate a power difference ΔP to be compensated; in an passive response mode, the power distribution system acquires a power regulation capacity ΔP issued by a power dispatching system; and ΔP is the total active power to be acquired.

Step 2: data information of power generation units in the power distribution system is acquired.

Figure 2:
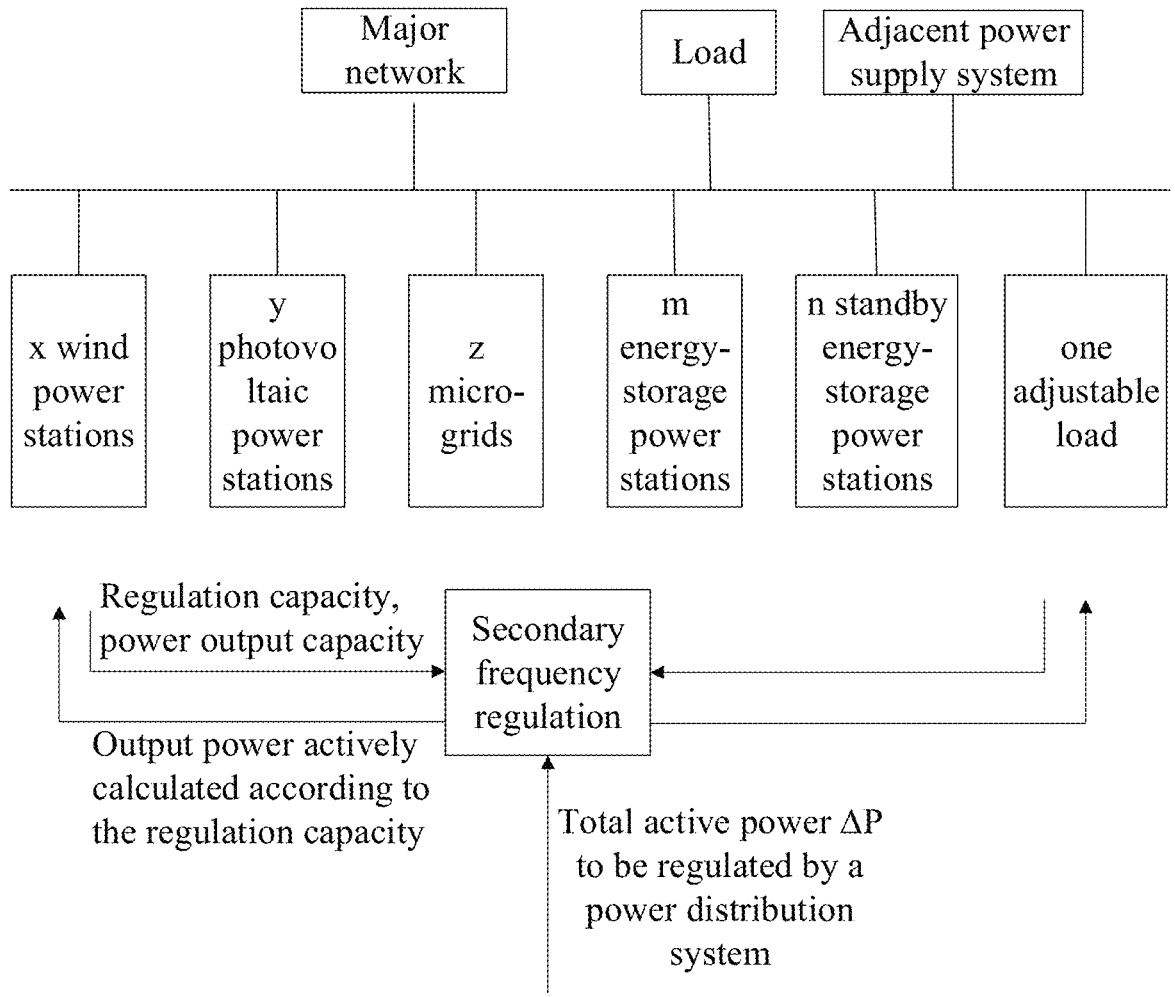
FIG. 2 is a framework diagram of a power distribution system of the source-grid-load-storage networked collaborative frequency control method according to one embodiment of the invention.
Figure 3A:
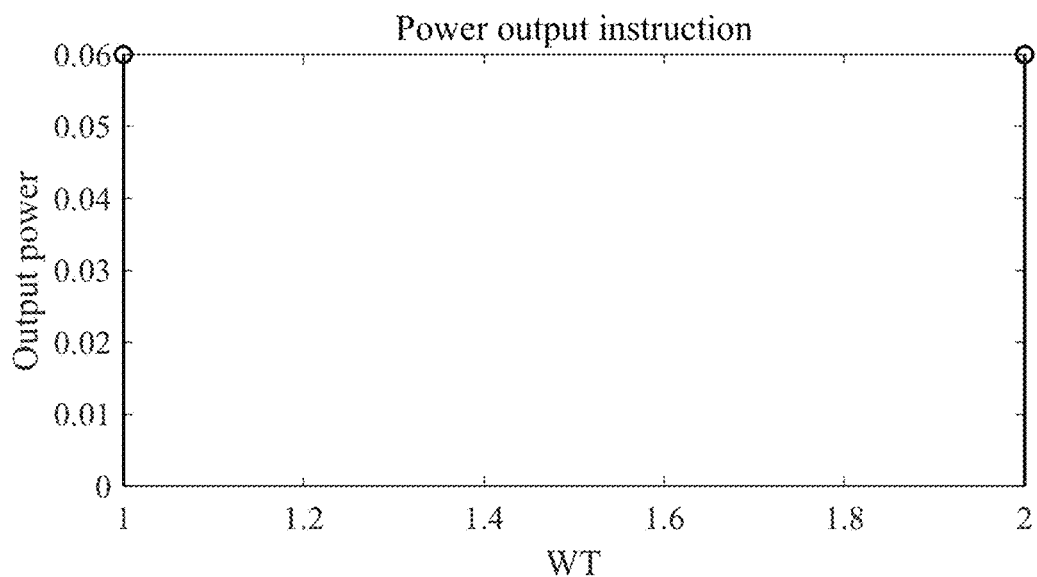
FIG. 3A through FIG. 3H illustrate simulation results of the source-grid-load-storage networked collaborative frequency control method according to one embodiment of the invention.
Figure 3B:
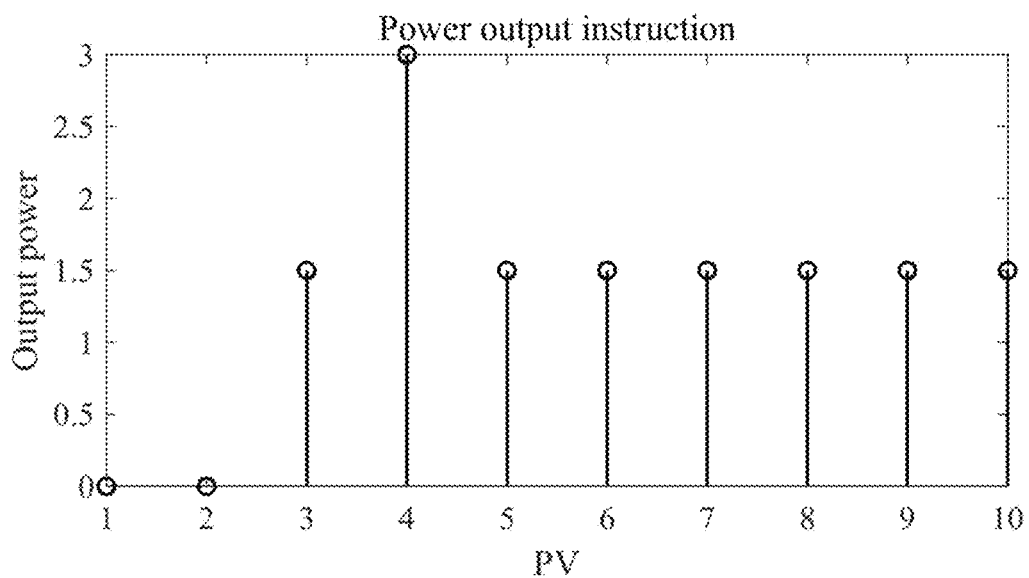
Figure 3C:
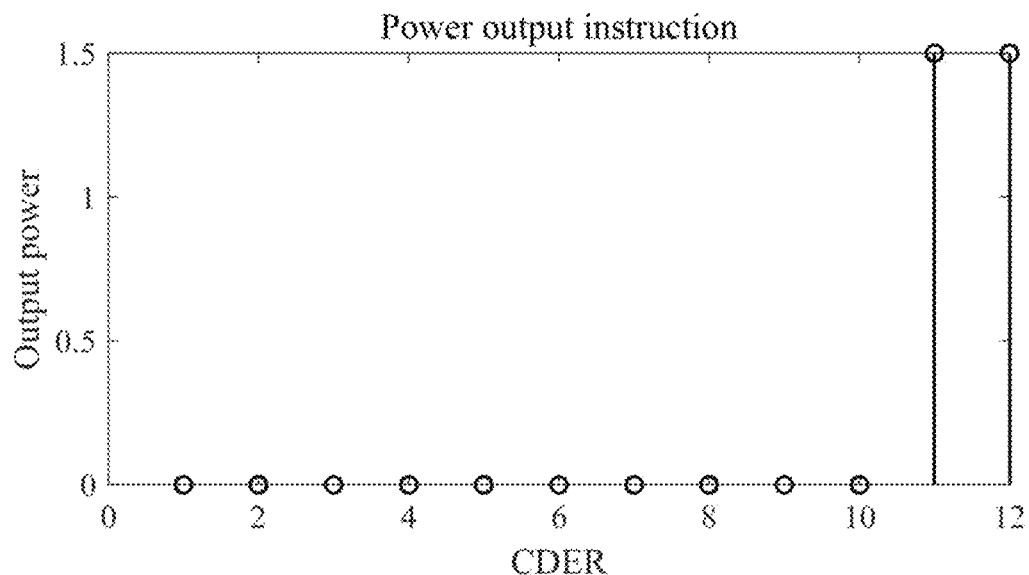
Figure 3D:
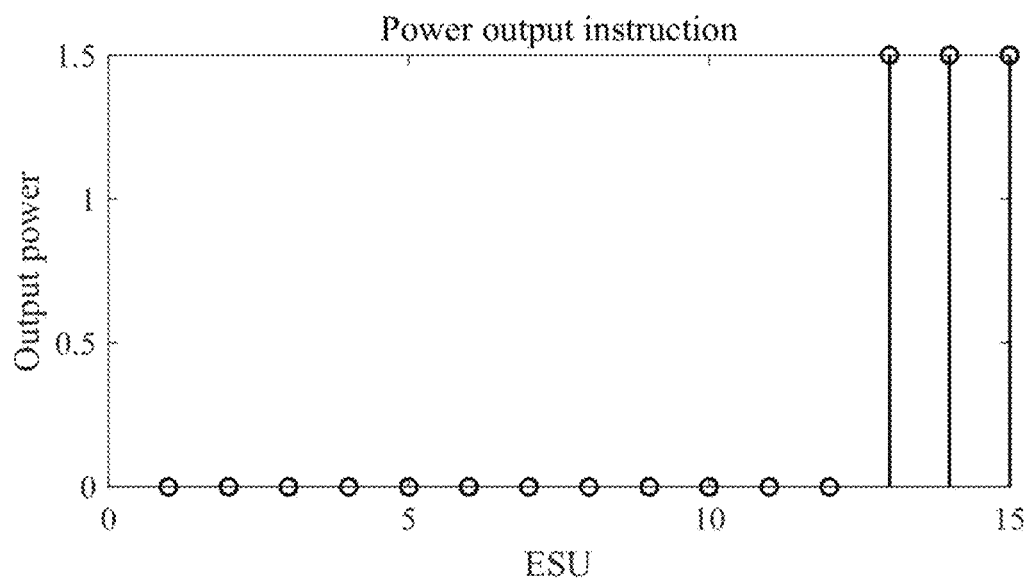
Figure 3E:
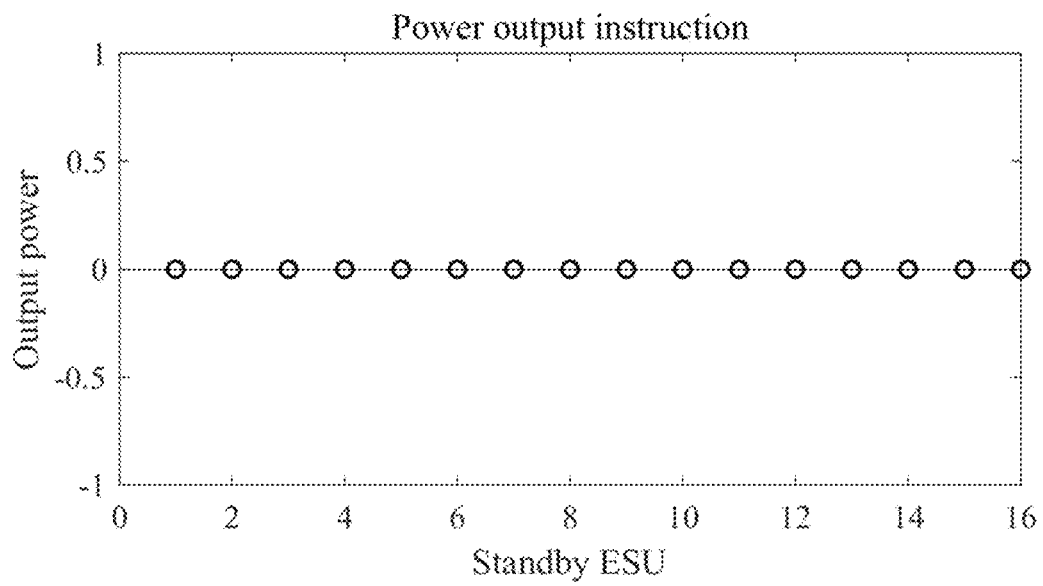
Figure 3F:
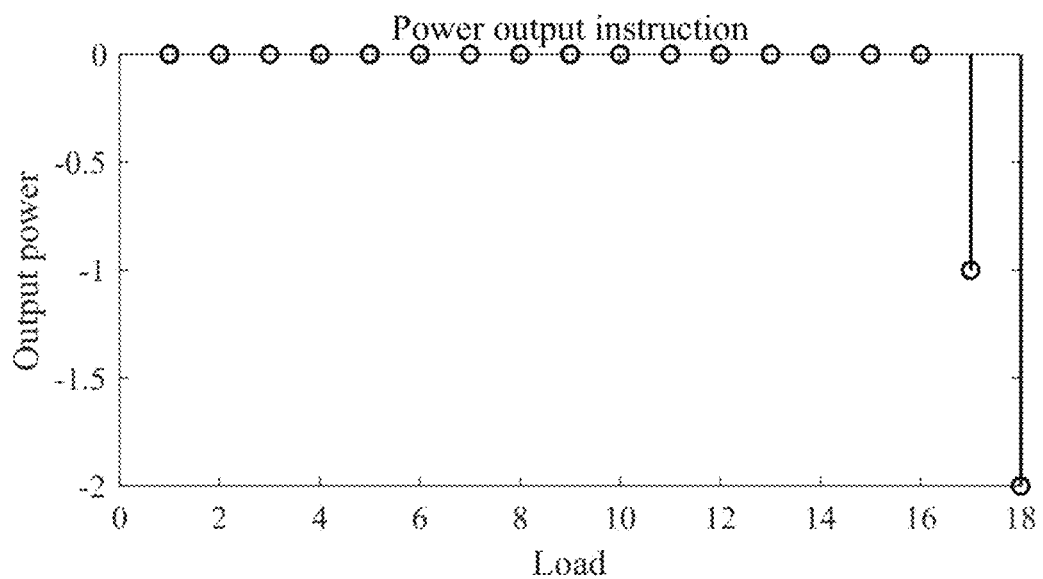
Figure 3G:
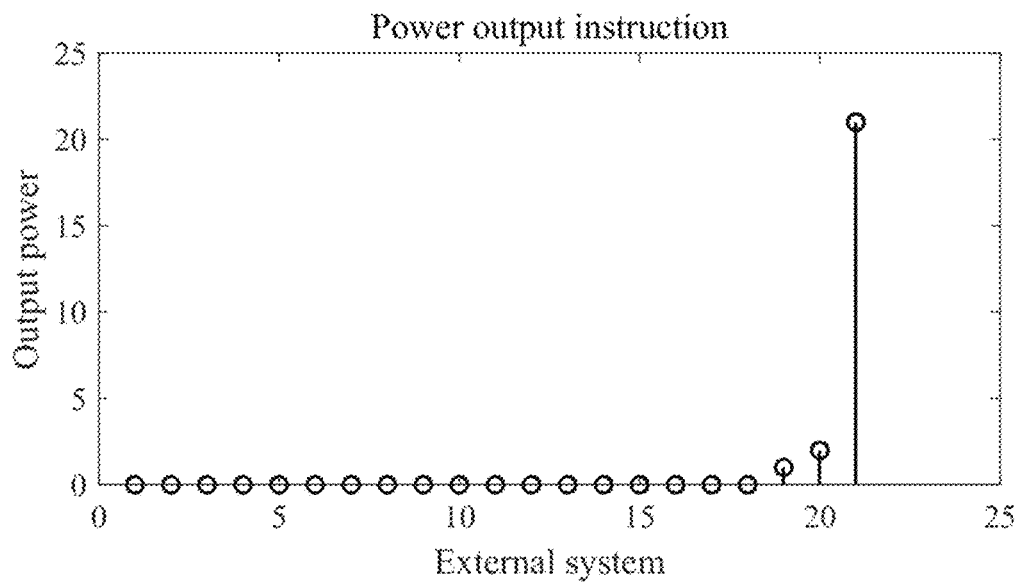
Figure 3H:
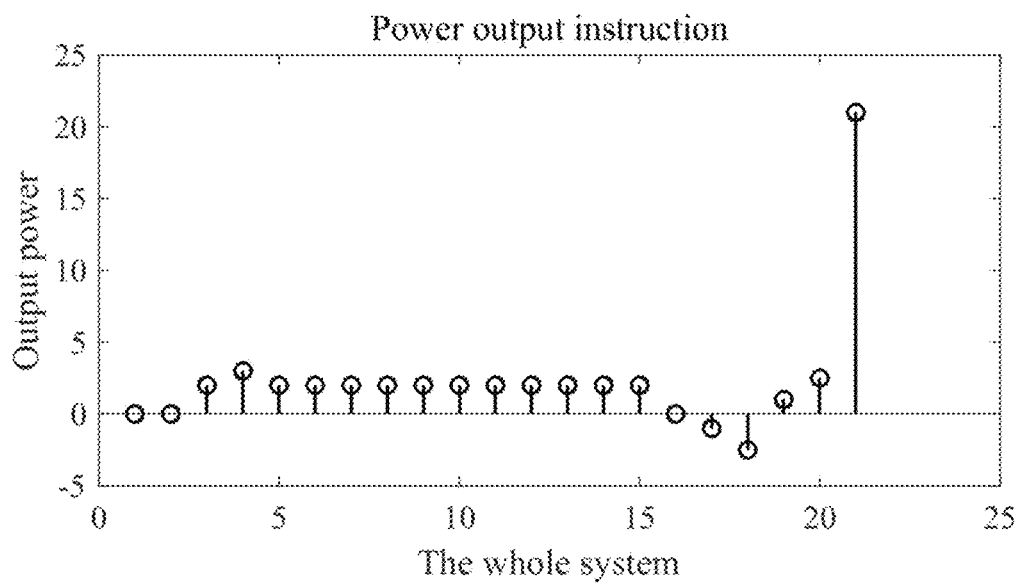

Specifically, current predictive generating capacity data information of wind power stations and photovoltaic power stations in the power distribution system is acquired, capacity information of energy-storage power stations in the power distribution system is acquired, and a current adjustable power range of micro-grids in the power distribution system is acquired. The number of the wind power stations, the number of the photovoltaic power stations, the number of the micro-grids, the number of the energy-storage power stations, the number of adjustable loads, and the number of adjacent external power supply systems are acquired. In this embodiment, as shown in FIG. 2, the power distribution system comprises x wind power stations, y photovoltaic power stations, z micro-grids, m energy-storage power stations, n standby energy-storage power stations, one adjustable load, and h adjacent power supply systems; wherein, the maximum up-regulation capacity of the wind power stations is max WT, the maximum up-regulation capacity of the photovoltaic power stations is max PV, the maximum up-regulation capacity of the micro-grids is max CDFR, the maximum up-regulation capacity of the energy-storage power stations is max ESU, the maximum up-regulation capacity of the standby energy-storage power stations is max bESU, the maximum up-regulation capacity of the adjustable load is max aload, and the maximum up-regulation capacity of the adjacent external power supply system is max waibu.

Step 3: difference adjustment coefficients of the power generation units in the power distribution system are collected.

Specifically, difference adjustment coefficients of the wind power stations, the photovoltaic power stations, the micro-grids and the energy-storage power stations are acquired. The difference adjustment coefficient of the wind power stations is kWT, the difference adjustment coefficient of the photovoltaic power stations is kPV, the difference adjustment coefficient of the micro-grids is kCDER, and the difference adjustment coefficient of the energy-storage power stations is kESU.

Step 4: a total active power regulation capacity C of source-grid-load-storage of the power distribution system is calculated.

The total active power regulation capacity of the source-grid-load-storage of the power distribution system is calculated according to the following formula:

$$C = \sum_{i=1}^{x} \max WT_i + \sum_{i=1}^{y} \max PV_i + \sum_{i=1}^{z} \max CDER_i + \sum_{i=1}^{m} \max ESU_i \quad (1)$$

Wherein, max WT represents a maximum regulation capacity of the wind power stations of the power distribution system, max PV represents a maximum regulation capacity of the photovoltaic power stations of the power distribution system, max CDER represents a maximum regulation capacity of the micro-grids of the power distribution system, max ESU represents a maximum regulation capacity of the energy-storage power stations of the power distribution system, C is a maximum total regulation capacity of the source-grid-load-storage of the power distribution system and represents the total active power regulation capacity C of the source-grid-load-storage of the power distribution system.

The total active power ΔP is compared with the total active power capacity quantity C, obtained by calculation, of the source-grid-load-storage of the power distribution system; if ΔP≤C, it is determined that the desired total active power is met after coordinated operation of the source-grid-load-storage of the power distribution system; or, if ΔP>C, it is determined that the desired total active power is not met after coordinated operation of the source-grid-load-storage of the power distribution system. In this embodiment, it is set that the wind power stations and the photovoltaic power stations of the power distribution system can meet the power regulation requirements.

Step 5: the total active power to be regulated by the power distribution system is allocated to power generation sources of the power distribution system according to the known difference adjustment coefficients of the power generation sources in the power distribution system.

Specifically, output power PWT of the wind power stations, output power PPV of the photovoltaic power stations, output power PCDER of the micro-grids, and output power PESU of the energy-storage power stations are calculated through ΔP and the difference adjustment coefficient kWT of the wind power stations, the difference adjustment coefficient kPV of the photovoltaic power stations, the difference adjustment coefficient kCDER of the micro-grids, and the difference adjustment coefficient kESU of the energy-storage power stations according to the following formula:

$$\text{chengji} = \Pi_{i=1}^{x} kWT_i \times \Pi_{i=x+1}^{x+y} kPV_i \times \Pi_{i=x+y+1}^{x+y+z} kCDER_i \times \Pi_{i=x+y+z+1}^{x+y+z+m} kESU_i \quad (2)$$

$$Y_i = \text{chengji} \div kWT_j, i=j=(1,2,\ldots,x) \quad (3)$$

$$Y_i = \text{chengji} \div kPV_j, i=(x+1, x+2, \ldots, x+y), j=(1,2,\ldots,y) \quad (4)$$

$$Y_i = \text{chengji} \div kCDER_j, i=(x+y+1, x+y+2, \ldots, x+y+z), j=(1,2,\ldots,z) \quad (5)$$

$$Y_i = \text{chengji} \div kESU_j, i=(x+y+z+1, x+y+z+2, \ldots, x+y+z+m), j=(1,2,\ldots,m) \quad (6)$$

$$\text{Total} = \sum_{i=1}^{x+y+z+m} Y_i \quad (7)$$

$$PWT_j = \Delta P \times (Y_i \div \text{Total}), i=j=(1,2,\ldots,x) \quad (8)$$

$$PPV_j = \Delta P \times (Y_i \div \text{Total}), i=(x+1, x+2, \ldots, x+y), j=(1,2,\ldots,y) \quad (9)$$

$$PCDER_j = \Delta P \times (Y_i \div \text{Total}), i=(x+y+1, x+y+2, \ldots, x+y+z), j=(1,2,\ldots,z) \quad (10)$$

$$PESU_j = \Delta P \times (Y_i \div \text{Total}), i=(x+y+z+1, x+y+z+2, \ldots, x+y+z+m), j=(1,2,\ldots,m) \quad (11)$$

Wherein, chengji is a product of the regulation coefficients of all the wind power stations, photovoltaic power stations, micro-grid groups and energy-storage power stations of the power distribution system; Y is a product of the regulation coefficients after a specific unit is removed from the wind power stations, photovoltaic power stations, micro-grid groups and energy-storage power stations of the power distribution system; $PWT_j$ is predictive output power, obtained by calculation, allocated to the $j^{th}$ wind generator in the wind power stations, $PPV_j$ is predictive output power, obtained by calculation, allocated to the $j^{th}$ photovoltaic panel in the photovoltaic power stations, $PCDER_j$ is predictive output power, obtained by calculation, allocated to the $j^{th}$ micro-grid in the micro-grid groups, and $PESU_j$ is predictive output power, obtained by calculation, allocated to the $j^{th}$ a energy-storage battery in the energy-storage power stations.

The predictive output power PWT of all units in the wind power stations, the predictive output power PPV of all units in the photovoltaic power stations, the predictive output power PCDER of all units in the micro-grids, and the predictive output power PESU of all units in the energy-storage power stations in the power distribution system are respectively compared with the maximum up-regulation capacity max WT, the maximum up-regulation capacity max PV, the maximum up-regulation capacity max CDER and the maximum up-regulation capacity max ESU to determine whether the power of the power generation units is out of limit. If the power of none of the power generation units in the wind power stations, the photovoltaic power stations, the micro-grids and the energy-storage power stations is out of limit, the predictive output power PWT of the units in the wind power stations, the predictive output power PPV of the units in the photovoltaic power stations, the predictive output power PCDER of the units in the micro-grids, and the predictive output power PESU of the units in the energy-storage power stations are result output values, and predictive output power PbESU of the standby energy-storage power stations, predictive output power aload of the adjustable loads, and predictive output power Pwaibu of the standby systems are 0. If the power of a certain power generation units in the wind power stations, the photovoltaic power stations, the micro-grids and the energy-storage power stations is out of limit, this power generation unit will be found. In this embodiment, assume the power of the second photovoltaic panel in one photovoltaic power station is out of limit, the power regulation capacity of the photovoltaic panel is adjusted to maximum $PPV_2$=max $PV_2$.

Preset active power of the other power generation units in the wind power stations, the photovoltaic power stations, the micro-grids and the energy-storage power stations is set according to inverse ratios of the difference adjustment coefficients of these power generation units to the difference adjustment coefficient of the second photovoltaic panel, and is calculated as follows:

$$PWT_i = PPV_2 \times \frac{kPV_2}{kWT_i}, \quad i = (1, 2, \cdots, x) \quad (12)$$

$$PPV_i = PPV_2 \times \frac{kPV_2}{kPV_i}, \quad i = (1, 2, \cdots, y) \; i \neq 2 \quad (13)$$

$$PCDER_i = PPV_2 \times \frac{kPV_2}{kCDER_i}, \quad i = (1, 2, \cdots, z) \quad (14)$$

$$PESU_i = PPV_2 \times \frac{kPV_2}{kESU_i}, \quad i = (1, 2, \cdots, m) \quad (15)$$

Wherein, $PWT_i$, $PPV_i$, $PCDER_i$ and $PESU_i$ are the output power of the units in the wind power stations, the output power of the units in the photovoltaic power stations, the output power of the units in the micro-grids and the output power of the units in the energy-storage power stations respectively.

Step 6: capacity information of standby energy-storage power stations of the power distribution system is collected, and when the power of the power generation units of the source-grid-load-storage of the power distribution system is out of limit, the standby energy-storage power stations are used to compensate a difference.

Specifically, after the preset output power of the wind power stations, the photovoltaic power stations, the micro-grids and the energy-storage power stations of the power distribution system is reset, whether the total active power ΔP to be regulated by the power distribution system is met by the wind power stations, the photovoltaic power stations, the micro-grids and the energy-storage power stations of the power distribution system, and the standby energy-storage power stations is determined.

$$\text{If } \Delta P \leq \Sigma_{i=1}^{x} PWT_i + \Sigma_{i=1}^{y} PPV_i + \Sigma_{i=1}^{z} PCDER_i + \Sigma_{i=1}^{m} PESU_i + \max bESU \quad (16)$$

It indicates that the capacity of the standby energy-storage power stations can compensate a power deficiency caused by power reallocation performed when the power generation units of the power distribution system are out of limit, and in this case, the output power of the standby energy-storage power stations is set to a difference between the total active power ΔP to be regulated by the power distribution system and the preset output power of the wind power stations, the photovoltaic power stations, the micro-grids and the energy-storage power stations of the power distribution system, that is:

$$PbESU = \Delta P - \Sigma_{i=1}^{x} PWT_i + \Sigma_{i=1}^{y} PPV_i + \Sigma_{i=1}^{z} PCDER_i + \Sigma_{i=1}^{m} PESU_i \quad (17)$$

All not the standby energy-storage power stations need to participate in power output, an order is planned in advance based on an economy principle according to data such as the capacity, failure rate and use cost of the standby energy-storage power stations, and the standby energy-storage power stations are used in order under the precondition of least cost.

$$\text{If } \Delta P > \Sigma_{i=1}^{x} PWT_i + \Sigma_{i=1}^{y} PPV_i + \Sigma_{i=1}^{z} PCDER_i + \Sigma_{i=1}^{m} PESU_i + \max bESU \quad (18)$$

It indicates that the capacity of the standby energy-storage power stations cannot compensate the power deficiency caused by power reallocation performed when the power generation units of the power distribution system are out of limit, and at this moment, whether the total active power ΔP to be regulated by the power distribution system is met by the wind power stations, the photovoltaic power stations, the micro-grids, the energy-storage power stations, the standby energy-storage power stations and the adjustable loads of the power distribution system is determined.

Step 7: regulation capacity information of the adjustable loads is collected, and in a case where the power of the power generation units of the source-grid-load-storage of the power distribution system is out of limit and the preset regulation capacity of the source-grid-load-storage and the total capacity of the standby energy-storage power stations are not enough, the adjustable loads are deployed to compensate an active power deficiency.

$$\text{If } \Delta P \leq \Sigma_{i=1}^{x} PWT_i + \Sigma_{i=1}^{y} PPV_i + \Sigma_{i=1}^{z} PCDER_i + \Sigma_{i=1}^{m} PESU_i + \max bESU + \max aload \quad (19)$$

It indicates that the power deficiency caused by power reallocation performed when the power of the power generation units of the power distribution system is out of limit can be compensated through collaborative interaction of the standby energy-storage power stations and the adjustable loads, and at this moment, the output power of the standby energy-storage power stations is preset to maximum PESU=max bESU, the output power of the wind power stations, the photovoltaic power stations, the micro-grids and the energy-storage power stations of the power distribution system is set to preset output power, and the regulation capacity of the adjustable loads is set to a difference between the total active power ΔP to be regulated by the power distribution system and the preset output power of the wind power stations, the photovoltaic power stations, the micro-grids, the energy-storage power stations and the standby energy-storage power stations of the power distribution system, that is:

$$\text{aload}=\Delta P-\Sigma_{i=1}^{x}PWT_i+\Sigma_{i=1}^{y}PPV_i+\Sigma_{i=1}^{z}PCDER_i+\Sigma_{i=1}^{m}PESU_i-\max bESU \quad (20)$$

All not the adjustable loads need to participate in power regulation, an order is planned in advance according to reference indicators, such as the type, importance and compensation cost, of the adjustable loads, and the adjustable loads are deployed in order to compensate the deficiency at the least deployment cost.

$$\text{If } \Delta P>\Sigma_{i=1}^{x}PWT_i+\Sigma_{i=1}^{y}PPV_i+\Sigma_{i=1}^{z}PCDER_i+\Sigma_{i=1}^{m}PESU_i+\max bESU+\max \text{aload} \quad (21)$$

It indicates that the power deficiency caused by power reallocation performed when the power of the power generation units of the power distribution system is out of limit cannot be compensated through the collaborative interaction of the standby energy-storage power stations and the adjustable loads, and at this moment, whether the total active power ΔP to be regulated by the power distribution system is met by the wind power stations, the photovoltaic power stations, the micro-grids, the energy-storage power stations, the standby energy-storage power stations and the adjustable loads of the power distribution system and power obtained from adjacent external systems is determined.

Step 8: accessible capacity information of the adjacent external systems of the power distribution system is collected, and in a case where the power of the power generation units of the source-grid-load-storage of the power distribution system is out of limit and the preset regulation capacity of the source-grid-load-storage and the total capacity of the standby energy-storage power stations and the adjustable loads are not enough, the adjacent external systems are used to compensate the active power deficiency by means of active power of other power distribution networks.

$$\text{If } \Delta P \leq \Sigma_{i=1}^{x}PWT_i+\Sigma_{i=1}^{y}PPV_i+\Sigma_{i=1}^{z}PCDER_i+\Sigma_{i=1}^{m}PESU_i+\max bESU+\max \text{aload}+\max \text{waibu} \quad (22)$$

It indicates that the power deficiency caused by power reallocation performed when the power of the power generation units of the power distribution system is out of limit can be compensated through collaborative interaction of the wind power stations, the photovoltaic power stations, the micro-grids, the energy-storage power stations, the standby energy-storage power stations, the adjustable loads and the adjacent external power supply systems of the power distribution system, and at this moment, the output power of the standby energy-storage power stations is preset to maximum PESU=max bESU, the regulation capacity of the adjustable loads is set to maximum aload=max aload, the output power of the wind power stations, the photovoltaic power stations, the micro-grids and the energy-storage power stations of the power distribution system is set to preset output power, and a dispatching value of the adjacent external systems is set to a difference between the total active power ΔP to be regulated by the power distribution system and preset output power of the wind power stations, the photovoltaic power stations, the micro-grids, the energy-storage power stations, the standby energy-storage power stations and the adjustable loads of the power distribution system, that is:

$$\text{waibu}=\Delta P-\Sigma_{i=1}^{x}PWT_i+\Sigma_{i=1}^{y}PPV_i+\Sigma_{i=1}^{z}PCDER_i+\Sigma_{i=1}^{m}PESU_i+\max bESU+\max \text{aload} \quad (23)$$

An order of the adjacent external systems is planned in advance according to the economic indicator of least power deployment cost, with reference to the indicators such as real-time electricity prices and deployment distance, and the adjacent external systems are economically used in order.

$$\text{If } \Delta P>\Sigma_{i=1}^{x}PWT_i+\Sigma_{i=1}^{y}PPV_i+\Sigma_{i=1}^{z}PCDER_i+\Sigma_{i=1}^{m}PESU_i+\max bESU+\max \text{aload}+\max \text{waibu} \quad (24)$$

It indicates that power deficiency caused by power reallocation performed when the power of the power generation units of the power distribution system is out of limit cannot be compensated through collaborative interaction of the wind power stations, the photovoltaic power stations, the micro-grids, the energy-storage power stations, the standby energy-storage power stations, the adjustable loads and the adjacent external power supply systems of the power distribution system, and at this moment, an output power distribution network cannot perform frequency control.

FIG. 3A through FIG. 3H illustrate output results of the power generation units and other units of the power distribution system in a case where a load of a power distribution network rises suddenly, the bus frequency falls, the frequency needs to be increased and the power of some units in the photovoltaic power stations is out of limit, in an actual simulation process. The simulation results indicate that the method provided by the invention can comprehensively use power generation sources, micro-grids, loads, energy storage and adjacent systems of the power distribution system, reasonably allocate a power deficiency according to difference adjustment coefficients of these units, and can handle long-term frequency disturbance and a large active power deficiency under the precondition that the power of the units of the power distribution system is not out of limit. New energy resources are preferentially used to the maximum extent in the whole control process, more control approaches for handling frequency fluctuations are used, and compared with pure use of diesel power generation or pure load cutback, the frequency regulation cost is lower, and the utilization rate of the units of source-grid-load-storage is increased.

Those skilled in the art would appreciate that the embodiments of the application can be provided as a method, a system or a computer program product. So, the embodiments of the application may be completely hardware embodiments, completely software embodiments, or embodiments combining software and hardware. In addition, the application may be in the form of a computer program product to be implemented on one or more computer-available storage media (including, but not limited to, a disk memory, a CD-ROM, an optical memory, and the like) comprising computer-available program codes.

The application is described with reference to the flow diagram and/or block diagram of the method, device (system) and computer program product provided by the embodiments of the application. It should be understood that each process and/or block in the flow diagram and/or block diagram and the combinations of processes and/or blocks in the flow diagram and/or block diagram can be implemented by computer program instructions. These computer program instructions can be configured in a general-purpose computer, a special-purpose computer, an embedded processor, or a processor of other programmable data processing devices to create a machine, so that the instructions can be executed by the computer or the processor of other programmable data processing device to create a device for realizing specific functions in one or more processes in the flow diagram and/or in one or more blocks in the block diagram.

These computer program instructions may also be stored in a computer-readable memory that can guide the computer or other program data processing devices to work in a specific manner, so that the instructions stored in the computer-readable memory can create a product including an instruction device, which implements specific functions in one or more processes of the flow diagram and/or one or more blocks in the block diagram.

These computer program instructions may also be loaded on a computer or other programmable data processing devices, so that the computer or other programmable devices can perform a series of operation steps to carry out processing realized by the computer, and the instructions are executed on the computer or other programmable devices to realize specific functions in one or more processes in the flow diagram and/or one or more block diagrams in the block diagram.

The above embodiments are merely preferred ones of the invention. It should be noted that various improvements and transformations may be made by those ordinarily skilled in the art without departing from the technical principle of the invention, and all these improvements and transformations should fall within the protection scope of the invention.

What is claimed is:

1. A source-grid-load-storage networked collaborative frequency control device, comprising:
   a processor; and
   a memory with a computer program stored therein, wherein the computer program, when executed by the processor, is configured to implement a source-grid-load-storage networked collaborative frequency control method, comprising:
   acquiring a desired total active power $\Delta P$ to be regulated by a power distribution system during a secondary frequency regulation process of a power grid;
   performing according to the desired total active power $\Delta P$, frequency regulation on source-grid-load-storage of the power distribution system, allocating power regulation capacities, and determining whether the desired total active power $\Delta P$ is met after the frequency regulation;
   if the desired total active power $\Delta P$ is met, determining whether power of power generation units is out of limit;
   if the power of the power generation units is not out of limit, keeping active power of the power distribution system in balance to complete frequency regulation of the power grid;
   if the power of the power generation units is out of limit, correcting the power regulation capacities of the power generation units of the source-grid-load-storage and compensating a power difference to keep the active power of the power distribution system in balance, so as to complete frequency regulation of the power grid; and
   if the desired total active power $\Delta P$ is not met, coordinating the source-grid-load-storage and other resources in the power distribution system to keep the active power of the power distribution system in balance, so as to complete frequency regulation of the power grid;
   wherein if the power of the power generation units is out of limit, correcting the power regulation capacities of the power generation units of the source-grid-load-storage and compensating a power difference, comprises:
   adjusting the output power of a power generation unit with the power being out of limit to maximum, and correcting power allocated to the other power generation units in the source-grid-load-storage of the power distribution system according to inverse ratios of the difference adjustment coefficients of these power generation units to the difference adjustment coefficient of the out-of-limit power generation unit;
   checking whether the power of the other power generation units is out of limit after correction, and correcting a power generation unit with the power being out of limit until all power generation units with the power being out of limit are corrected;
   when the total active power regulation capacity of all the power generation units still does not meet the desired total active power $\Delta P$ to be regulated after correction, adjusting power allocated to the micro-grid groups;
   when the total active power regulation capacity of all the power generation units still does not meet the desired total active power $\Delta P$ to be regulated after power is reallocated to the micro-grid groups, using the energy-storage power stations to compensate an active power deficiency; and
   when the desired total active power $\Delta P$ to be regulated is still not met after the energy-storage power stations are used, using the standby energy-storage power stations in the power distribution system to compensate the active power deficiency to keep the active power of the power distribution system in balance, so as to complete frequency regulation of the power grid.

2. The source-grid-load-storage networked collaborative frequency control device according to claim 1, wherein the power distribution system comprises the source-grid-load-storage, standby energy-storage power stations and adjacent external systems, and the source-grid-load-storage comprises wind power stations, photovoltaic power stations, micro-grid groups, adjustable loads, and energy-storage power stations.

3. The source-grid-load-storage networked collaborative frequency control device according to claim 1, wherein acquiring a desired total active power $\Delta P$ to be regulated by a power distribution system during a secondary frequency regulation process of a power grid, specific comprises:
   detecting frequency disturbance of the power grid, and collecting a current frequency of the power grid when the frequency disturbance of the power grid exceeds a rated error;
   in an active response mode, actively giving a response to a frequency deviation obtained after primary frequency regulation to calculate a power difference to be compensated, by the power distribution system;

and in a passive response mode, acquiring, by the power distribution system, a power regulation capacity issued by a power dispatching system, wherein the power difference to be compensated and the power regulation capacity are each the desired total active power ΔP.

4. The source-grid-load-storage networked collaborative frequency control device according to claim 1, wherein determining whether the desired total active power ΔP is met after the frequency regulation of the source-grid-load-storage of the power distribution system, comprises:

calculating a total active power regulation capacity C of the source-grid-load-storage of the power distribution system;

comparing the desired total active power ΔP with the total active power regulation capacity C, obtained by calculation, of the source-grid-load-storage of the power distribution system;

if ΔP≤C, determining that the desired total active power ΔP is met after coordinated operation of the source-grid-load-storage of the power distribution system; or if ΔP>C, determining that the desired total active power ΔP is not met after coordinated operation of the source-grid-load-storage of the power distribution system.

5. The source-grid-load-storage networked collaborative frequency control device according to claim 1, wherein when the desired total active power ΔP is not met, coordinating the source-grid-load-storage and other resources in the power distribution system, comprises:

adjusting the regulation capacity of the power generation units, the micro-grid groups and the energy-storage power stations of the source-grid-load-storage of the power distribution system to maximum, and compensating an active power deficiency by the standby energy-storage power stations in the power distribution system.

6. The source-grid-load-storage networked collaborative frequency control device according to claim 1, wherein when the desired total active power ΔP to be regulated is still not met after the standby energy-storage power stations in the power distribution system are used, adjustable loads of the source-grid-load-storage are deployed to decrease or increase active power consumption.

7. The source-grid-load-storage networked collaborative frequency control device according to claim 6, wherein when the desired total active power ΔP to be regulated is still not met after the standby energy-storage power stations in the power distribution system are used and the adjustable loads are deployed, adjacent external systems and active power of other power distribution networks are used to compensate the active power deficiency.

8. The source-grid-load-storage networked collaborative frequency control device according to claim 7, wherein the source-grid-load-storage networked collaborative frequency control method further comprises: allocating the power regulation capacities to the units in the power distribution systems according to a principle of economic optimality when the standby energy-storage power stations and the adjacent external systems are used and the adjustable loads are deployed for active power compensation.

9. The source-grid-load-storage networked collaborative frequency control device according to claim 8, wherein the principle of economic optimality comprises: using the standby energy-storage power stations in order according to high generating capacity and lower failure rate, with reference to historical power generation data and failure rate all year round; using the adjustable loads in order according to low importance and low compensation cost, with reference to the level of importance and compensation cost; and using the adjacent external systems in order according to high energy utilization rate and low dispatching cost, with reference to real-time electricity price and dispatching loss.

10. A non-transitory computer-readable storage medium with a computer program stored thereon, wherein the computer program, when executed by a processor, is configured to perform a source-grid-load-storage networked collaborative frequency control method, comprising:

acquiring a desired total active power ΔP to be regulated by a power distribution system during a secondary frequency regulation process of a power grid;

performing according to the desired total active power ΔP, frequency regulation on source-grid-load-storage of the power distribution system, allocating power regulation capacities, and determining whether the desired total active power ΔP is met after the frequency regulation;

if the desired total active power ΔP is met, determining whether power of power generation units is out of limit;

if the power of the power generation units is not out of limit, keeping active power of the power distribution system in balance to complete frequency regulation of the power grid;

if the power of the power generation units is out of limit, correcting the power regulation capacities of the power generation units of the source-grid-load-storage and compensating a power difference to keep the active power of the power distribution system in balance, so as to complete frequency regulation of the power grid; and if the desired total active power ΔP is not met, coordinating the source-grid-load-storage and other resources in the power distribution system to keep the active power of the power distribution system in balance, so as to complete frequency regulation of the power grid;

wherein if the power of the power generation units is out of limit, correcting the power regulation capacities of the power generation units of the source-grid-load-storage and compensating a power difference, comprises:

adjusting the output power of a power generation unit with the power being out of limit to maximum, and correcting power allocated to the other power generation units in the source-grid-load-storage of the power distribution system according to inverse ratios of the difference adjustment coefficients of these power generation units to the difference adjustment coefficient of the out-of-limit power generation unit;

checking whether the power of the other power generation units is out of limit after correction, and correcting a power generation unit with the power being out of limit until all power generation units with the power being out of limit are corrected;

when the total active power regulation capacity of all the power generation units still does not meet the desired total active power ΔP to be regulated after correction, adjusting power allocated to the micro-grid groups;

when the total active power regulation capacity of all the power generation units still does not meet the desired total active power ΔP to be regulated after power is reallocated to the micro-grid groups, using the energy-storage power stations to compensate an active power deficiency; and when the desired total active power ΔP to be regulated is still not met after the energy-storage power stations are used, using the standby energy-storage power distribution system to compensate the active power deficiency to keep the active power of the power distribution system in balance, so as to complete frequency regulation of the power grid.

11. A source-grid-load-storage networked collaborative frequency control method, implemented by a control device, wherein the control device comprises: a processor and a memory with a computer program stored therein, the computer program, when executed by the processor, is configured to implement the source-grid-load-storage networked collaborative frequency control method, and the source-grid-load-storage networked collaborative frequency control method comprises:

acquiring, by the processor, a desired total active power $\Delta P$ to be regulated by a power distribution system during a secondary frequency regulation process of a power grid;

performing, by the processor, according to the desired total active power $\Delta P$, frequency regulation on source-grid-load-storage of the power distribution system, allocating, by the processor, power regulation capacities, and determining, by the processor, whether the desired total active power $\Delta P$ is met after the frequency regulation;

in response to the desired total active power $\Delta P$ being met, determining, by the processor, whether power of power generation units is out of limit; and in response to the power of the power generation units being out of limit, correcting, by the processor, the power regulation capacities of the power generation units of the source-grid-load-storage and compensating, by the processor, a power difference to keep the active power of the power distribution system in balance, so as to complete frequency regulation of the power grid, comprising:

adjusting, by the processor, the output power of a power generation unit with the power being out of limit to maximum, and correcting, by the processor, power allocated to the other power generation units in the source-grid-load-storage of the power distribution system according to inverse ratios of the difference adjustment coefficients of these power generation units to the difference adjustment coefficient of the out-of-limit power generation unit;

checking, by the processor, whether the power of the other power generation units is out of limit after correction, and correcting, by the processor, a power generation unit with the power being out of limit until all power generation units with the power being out of limit are corrected;

when the total active power regulation capacity of all the power generation units still does not meet the desired total active power $\Delta P$ to be regulated after correction, adjusting, by the processor, power allocated to the micro-grid groups;

when the total active power regulation capacity of all the power generation units still does not meet the desired total active power $\Delta P$ to be regulated after power is reallocated to the micro-grid groups, using, by the processor, the energy-storage power stations to compensate an active power deficiency; and when the desired total active power $\Delta P$ to be regulated is still not met after the energy-storage power stations are used, using, by the processor, the standby energy-storage power stations in the power distribution system to compensate the active power deficiency to keep the active power of the power distribution system in balance, so as to complete frequency regulation of the power grid.

* * * * *